2,999,846
HIGH MOLECULAR WEIGHT THERMOPLASTIC AROMATIC SULFOXY POLYCARBONATES
Hermann Schnell, Krefeld-Urdingen, and Heinrich Krimm, Krefeld-Bockum, Germany
No Drawing. Filed Nov. 27, 1957, Ser. No. 699,194
Claims priority, application Germany Nov. 30, 1956
9 Claims. (Cl. 260—49)

The present invention is concerned with a process for the production of high molecular weight thermoplastic materials.

The subject of the U.S. patent application Serial No. 572,793 is a process for the production of high molecular weight thermoplastic materials, which comprises converting dihydroxy-diarylene-sulphones alone, or together with other dihydroxy compounds into high molecular weight polycarbonates.

The present invention is a further development of this process. The objects of the present invention are new thermoplastic materials of the polyester type, melting at high temperatures without decomposition and having technically useful properties. The new polycarbonates are characterized by the essential recurring of units consisting of residues of dihydroxy-diarylene sulphoxides selected from the group consisting of unsubstituted dihydroxyarylene sulphoxides and dihydroxy-diarylene sulphoxides with aliphatic side chains up to 4 carbon atoms at the aromatic rings.

They include as the essential recurring unit a unit of the formula:

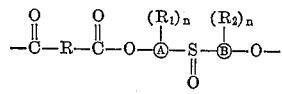

in which R is the dioxy radical of dihydroxy compound, A and B are the same or different aromatic groups selected from the group consisting of the benzene and the naphthalene ring, $R_1$ and $R_2$ are aliphatic substituents containing up to 4 carbon atoms and $n$ is 0 to 4.

The further object of the invention is a process for producing such new polycarbonates containing residues of dihydroxy-diarylene sulphoxides.

The new plastic materials show but a slight tendency to crystallization and are soluble in a large number of organic solvents and solvent mixtures such as methylene chloride, chloroform, cyclohexanone, dimethyl formamide, dioxane and phenol. They can be worked up to films, foils or lacquer coatings from such solutions. Since they generally melt at temperatures above 200° C. without decomposition, they may also be worked up, for example, by compression moulding, injection moulding, flame spraying, or by the spin sinter process to give useful moulded objects or hard coatings which adhere tenaciously.

In the dihydroxy-diarylene sulphoxides used for forming the polycarbonates according to the invention, the arylene residues can be the same or different. The arylene residues can furthermore carry hydrogen atoms or substituents which are incapable of taking part in the reaction to polycarbonates, e.g. alkyl groups such as ethyl, methyl, propyl or tertiary butyl.

As examples of dihydroxydiarylene sulphoxides of the specified type, the following may be mentioned:

4,4′-dihydroxy-diphenylene sulphoxide,
2,2′-dihydroxy-diphenylene sulphoxide,
3,3′-dihydroxy-diphenylene sulphoxide,
4,4′-dihydroxy-2,2′-dimethyl-diphenylene sulphoxide,
4,4′-dihydroxy-3,3′-dimethyl-diphenylene sulphoxide,
2,2′-dihydroxy-4,4′-dimethyl-diphenylene sulphoxide,
4,4′-dihydroxy-2,2′-diethyl-diphenylene sulphoxide,
4,4′-dihydroxy-3,3′-diethyl-diphenylene sulphoxide,
4,4′-dihydroxy-2,2′-di-tert.butyl-diphenylene sulphoxide,
4,4′-dihydroxy-3,3′-di-tert.-butyl - diphenylene sulphoxide and
2,2′-dihydroxy-1,1′-dinaphthalene sulphoxide.

We prefer the 4,4′-dihydroxy-diphenylene sulphoxides, mentioned above. They are, for example, easily obtained by condensation of thionyl chloride with the corresponding phenols in the presence of Friedel-Crafts catalysts.

As examples of the other dihydroxy compounds which may be used in admixture with the dihydroxy-diarylene sulphoxides, if desired, there may be mentioned the following: aliphatic dihydroxy compounds, such as: ethylene glycol, diethylene glycol, triethylene glycol, polyethylene glycol, the corresponding thioethers, di- or polyglycols obtained from propylene oxide-1,2, propanediol-1,2, propanediol-1,3, butanediol-1,3, butanediol-1,4, 2-methylpropanediol-1, 3, pentanediol-1,5, 2-methylpropanediol-1,3, hexanediol-1,6, octanediol-1,8, 2-ethylhexanediol - 1,3, decanediol-1,10, and o-, p- or m-xylenene glycol; cycloaliphatic dihydroxy compounds, such as cyclohexanediol-1,2, cyclohexanediol - 1,4, 2,2-(4,4′-dihydroxy-dicyclohexyl)-propane and 2,6-dihydroxy-decahydronaphthalene; and aromatic dihydroxy compounds, such as hydroquinone, resorcinol, pyrocatechol, 4,4′-dihydroxy-diphenyl, 2,2′-di-hydroxy-diphenyl, 1,4-dihydroxy-naphthalene, 1,6-dihydroxy-naphthalene, 2,6 - dihydroxy-naphthalene, 1,2-dihydroxy-naphthalene, 1,5-dihydroxy-anthracene, 2,2′-dihydroxy-dinaphthalene-1,1′, and o-, m-, or p-hydroxybenzylalcohol, and especially di-monohydroxy-arylene alkanes, such as 4,4′-dihydroxy-diphenylene-methane,
1,1-(4,4′-dihydroxy-diphenylene)-ethane,
1,1-(4,4′-dihydroxy-diphenylene)-propane,
1,1-(4,4′dihydroxy-diphenylene)-butane,
1,1-(4,4′-dihydroxy-diphenylene)-2-methyl-propane,
1,1(4,4′-dihydroxy-diphenylene)-heptane,
1,1-(4,4′-dihydroxy-diphenylene)-1-phenyl-methane,
(4,4′dihydroxy-diphenylene)-(4-methylphenylene)- methane,
(4,4′-dihydroxy-diphenylene)-(4-ethyl-phenylene)- methane,
(4,4′-dihydroxy-diphenylene)-(4-isopropyl - phenylene)- methane,
(4,4′-dihydroxy-diphenylene)-(4-butyl-phenylene)- methane,
(4,4′-dihydroxy-diphenylene)-benzyl-methane,
(4,4′-dihydroxy-diphenylene)-α-furyl-methane,
2,2-(4,4′-dihydroxy-diphenylene)-propane,
2,2-(4,4′-dihydroxy-diphenylene)-butane,
2,2-(4,4′-dihydroxy-diphenylene)-pentane (melting point 149–150° C.),
2,2-(4,4′-dihydroxy-diphenylene)-4-methyl-pentane,
2,2-(4,4′-dihydroxy-diphenylene)-heptane (boiling point 198–200° C. under 0.3 mm. mercury gauge),
2,2-(4,4′-dihydroxy-diphenylene)-octane,
2,2-(4,4′-dihydroxy-diphenylene)-nonane (melting point 68° C.),
1,1-(4,4′-dihydroxy-diphenylene)-1-phenyl-ethane,
(4,4′-dihydroxy-diphenylene)-1-(α-furyl)-ethane,
3,3-(4,4′-dihydroxy-diphenylene)-pentane,
4,4-(4,4′-dihydroxy-diphenylene)-heptane,
1,1-(4,4′-dihydroxy-diphenylene)-cyclopentane,
1,1-(4,4′-dihydroxy-diphenylene)-cyclohexane,
2,2-(4,4′-dihydroxy-diphenylene) - decahydronaphthalene (melting point 181° C.),
2,2-(4,4′-dihydroxy-3,3′-dicyclohexyl-diphenylene) - propane (melting point 144–146° C.),
2,2-(4,4′-dihydroxy-3 - methyl - diphenylene) - propane (melting point 114° C.), 2,2-(4,4'-dihydroxy-3-isopropyl-diphenylene)-butane,
1,1-(4,4'-dihydroxy-3,3'-dimethyl-diphenylene)-cyclohexane,
2,2-(4,4'-dihydroxy-3,3'-dibutyl-diphenylene)-propane,
2,2-(4,4'-dihydroxy-3,3'-diphenyl-diphenylene)-propane,
2,2-(4,4'-dihydroxy-2,2'-dimethyl-diphenylene)-propane,
1,1-(4,4'-dihydroxy-3,3'-dimethyl-6,6'-dibutyl-diphenylene)-butane,
1,1-(4,4'-dihydroxy-3,3'-dimethyl-6,6'-di-tert.butyl-diphenylene)-ethane,
1,1-(4,4'-dihydroxy-3,3'-dimethyl-6,6'-di-tert.butyl-diphenylene)-propane,
1,1-(4,4'-dihydroxy-3,3'-dimethyl-6,6'-di-tert.butyl-diphenylene)-butane,
1,1-(4,4'-dihydroxy-3,3'-dimethyl-6,6'-di-tert.butyl-diphenylene)-isobutane,
1,1-(4,4'-dihydroxy-3,3'-dimethyl-6,6'-di-tert.butyl-diphenylene)-heptane,
1,1-(4,4'-dihydroxy-3,3'-dimethyl-6,6'-di-tert.butyl-diphenylene)-1-phenyl-methane,
1,1-(4,4'-dihydroxy-3,3'-dimethyl-6,6'-di-tert.butyl-diphenylene)-2-methyl-2-pentane,
1,1-(4,4'-dihydroxy-3,3'-dimethyl-6,6'-di-tert.butyl-diphenylene)-2-ethyl-2-hexane, and
1,1-(4,4'-dihydroxy-3,3'-dimethyl-6,6'-di-tert.amyl-diphenylene)-butane, furthermore
4,4'-dihydroxy-diphenylene sulphone, 2,2'-dihydroxy-diphenylene sulphone, 3,3'-dihydroxy-diphenylene sulphone,
4,4'-dihydroxy-2,2'-dimethyl-diphenylene sulphone,
4,4'-dihydroxy-3,3'-diethyl-diphenylene sulphone,
2,2'-dihydroxy-4,4'-dimethyl-diphenylene sulphone,
4,4'-dihydroxy-2,2'-diethyl-diphenylene sulphone,
4,4'-dihydroxyl-3,3'-diethyl-diphenylene sulphone,
4,4'-dihydroxy-2,2'-di-tert.butyl-diphenylene sulphone,
4,4'-dihydroxy-3,3'-di-tert.butyl-diphenylene sulphone and
2,2'-dihydroxy-1,1'-dinaphthylene sulphone.

The process according to the present invention for producing the new polycarbonates consists in reacting said dihydroxy-diarylene sulphoxides, or mixtures thereof with the aforementioned dihydroxy compounds with derivatives of carbonic acid selected from the group consisting of diesters of carbonic acid, especially diarylesters, mixed diesters of the aforesaid dihydroxy-diarylene sulphoxides and other dihydroxy compounds, phosgene, and bis-chlorocarbonic acid esters of the aforesaid di-hydroxy-diarylene sulphoxides and of the other dihydroxy compounds.

Thus it is possible to produce the new polycarbonates by interesterifying dihydroxy-diarylene sulphoxides, optionally mixed with the aforesaid dihydroxy compounds and suitably in the presence of acidic or basic catalysts, with dialkyl, dicycloalkyl, or diaryl carbonates, such as dimethyl-, diethyl-, dipropyl-, dibutyl-, diamyl-, dioctyl-, dicyclohexyl-, and especially with the diphenyl- and di-o-, m- or p-toluyl carbonate, or with the mixed esters, for instance with the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propyl-phenyl, the ethyl-o-, m- or p-toluyl and the cyclohexyl-phenyl carbonate, also with mixed bis-carbonates of monohydroxy compounds mentioned above and the aforesaid dihydroxy-diarylene sulphoxides of the type: bis-(aryl- or cycloalkyl- or alkyl-carbonato-arylene)-sulphoxide, particularly at elevated temperatures from about 50–330° C. and especially from about 120 to about 290° C. and under reduced pressure for instance up to 0.1 mm. mercury gauge.

By re-esterifying the mentioned carbonic acid diesters, the corresponding alkyl or cycloalkyl alcohols or the corresponding phenols are split off.

The re-esterifying process has to be carried out while excluding oxygen. We prefer to pass an inert-gas such as hydrogen, nitrogen, or carbon dioxide gas through the melt.

The re-esterification may be activated by re-esterifying catalysts, such as inorganic bases, for example caustic soda and potassium hydroxide, high boiling organic bases such as acridine, metal hydrides such as lithium and calcium hydride, alkali or alkaline earth metals such as sodium, potassium, magnesium, and calcium, metal oxides such as zinc oxide, aluminium oxide, lead oxide, antimonotrioxide, cerium oxide, and boron oxide, acids such as phosphoric acid and p-toluene sulphonic acid, salts such as sodium benzoate, calcium acetate, and boron phosphate, and alcoholates and phenolates.

The new polycarbonates can also be produced by introducing phosgene into solutions of dihydroxy-diarylene sulphoxides, eventually in mixture with the aforesaid dihydroxy compounds in organic bases such as dimethylaniline, diethylaniline, trimethylamine, and pyridine, or in indifferent organic solvents, such as petrol, ligroin, cyclohexane, methylcyclohexane, benzene, toluene, xylene, chloroform, methylene chloride, carbon tetrachloride, trichloroethylene, di-chloroethane, methylacetate, and ethylacetate, with addition of an acid-binding agent, e.g. tertiary amines.

A process particularly suitable for producing polycarbonates consists in introducing phosgene into the aqueous solution or suspension of alkali or alkaline earth metal salts, such as lithium, sodium, potassium, and calcium salts of the dihydroxy-diarylene sulphoxides or mixtures containing them, preferably in the presence of an excess of a base, such as lithium, sodium, potassium and calcium hydroxide or carbonate. The polycarbonates then precipitate out from the aqueous solution.

The conversion in the aqueous solution is promoted by the addition of reaction inert solvents of the kind mentioned above which are capable of dissolving phosgene and eventually the produced polycarbonate.

The phosgene may be used in an equivalent amount. Generally, however, it is preferable to use an excess of the phosgene. Suitable temperatures are from about 0° C. to about 100° C.

Finally it is also possible to react bis-chlorocarbonates of dihydroxy-diarylene sulphoxide, optionally mixed with such of the aforementioned other dihydroxy compounds, or with the aforementioned dihydroxy compounds, optionally also with mixtures of such dihydroxy compounds and with dihydroxy-diarylene sulphoxides. The condensation proceeds suitably in the presence of inert solvents and acid-binding materials, e.g. tertiary amines.

When using phosgene or bis-chlorocarbonic acid esters as derivatives of the carbonic acid in producing polycarbonates according to the invention catalysts also may be advantageous. Such catalysts are for instance tertiary or quaternary organic bases or salts thereof, such as trimethylamine, triethylamine, dimethylaniline, diethylaniline, dimethylcyclohexylamine, and pyridine, or for instance the corresponding hydrochlorides, and tetramethylammoniumhydroxide, triethyloctadecyl-ammoniumchloride, trimethyl-benzylammoniumfluoride, triethylbenzylammoniumchloride, dimethyldodecyl-ammoniumchloride, dimethylbenzylphenyl-ammoniumchloride, trimethylcyclohexylammoniumbromide, and N-methylpyridiniumchloride, in amounts from about 0.05 to about 5 percent by weight. These compounds may be added to the reaction mixture before or during the reaction.

Further in some of these cases we prefer to add surface active agents, such as alkali metal salts of higher fatty acids or of sulphonic acids of higher aliphatic or of aromatic hydrocarbons and polyoxyethylated alcohols and phenols. Greater amounts of the quaternary ammonium bases mentioned above, too, act as such surface active agents.

In the production of polycarbonates according to the various processes it further is advantageous to employ small amounts of reducing agents, for example sodium or potassium sulphide, sulphite, and dithionite, or free phenol and p-tert.butyl-phenol.

By adding monofunctional compounds which are capable of reacting with phosgene or with the end groups of the polycarbonates consisting of the chlorocarbonic acid ester group and which terminate the chains, such as the phenols, for instance phenol, tert.butylphenol, cyclohexylphenol, and 2,2-(4-hydroxyphenylene-4'-methoxyphenylene)propane, as well as aniline and methylaniline, it is possible to regulate the molecular weight of the polycarbonates in wide limits.

For a better understanding of the invention, the following examples are given by way of illustration:

*Example 1*

Into a solution of 234 grams (1 mol) of 4,4'-dihydroxy-diphenylene-sulphoxide in 1640 grams of 10 percent sodium hydroxide solution is passed at 20–25° C. after the addition of 1 litre of methylene chloride, 149 grams (1.5 mol) of phosgene. 0.5 gram of triethylamine and 4 grams of sodium isopropylnaphthalene-sulphonate are then added and the initially fluid reaction mixture allowed to stiffen to a thick paste. This paste is washed out in a kneader with water, dilute hydrochloric acid and again with water, and is then broken up and dried. A colourless, elastic material with a softening range of 230° to 250° C. is obtained which is, for example, soluble in methylene chloride, chloroform, cyclohexanone, dimethyl formamide and phenol. It is suitable for the production of lacquer coatings and foils from solutions, as well as for thermoplastic working up to give all types of moulded bodies.

*Example 2*

Into a solution of 117 grams (0.5 mol) of 4,4'-dihydroxy-diphenylene-sulphoxide and 114 grams (0.5 mol) of 2,2 - (4,4'-dihydroxy-diphenylene)-propane in 1640 grams of 10 percent sodium hydroxide solution, is passed at 20–25° C., after the addition of 600 grams of methylene chloride, 149 grams (1.5 mols) of phosgene within a period of 2 hours. 0.5 gram of triethylamine and 4 grams of sodium isopropyl naphthalene sulphonate are then added whereupon a sticky paste is formed. This is washed out in a kneader with water, dilute hydrochloric acid and again with water, and is then broken up and dried. A colourless, elastic material with a softening range of 230° to 250° C. is obtained which is soluble in, for example, methylene chloride, chloroform, cyclohexanone, dimethyl formamide, phenol and dioxane. It is suitable for the production of lacquer coatings and foils from solutions, as well as for thermoplastic working up to give moulded bodies of all types.

We claim:

1. A film-forming high molecular weight resinous thermoplastic linear polycarbonate of a dihydroxy compound having the formula

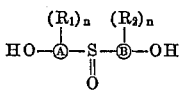

in which A and B are aromatic radicals selected from the class consisting of benzene and naphthalene radicals, $R_1$ and $R_2$ are alkyl substituents containing up to four carbon atoms, and each $n$ is a number from 0 to 4 inclusive, each hydroxyl group of said dihydroxy compound being esterified with carbonic acid, thus forming long polycarbonate molecular chains.

2. Products according to claim 1 wherein A and B are the same.

3. Products according to claim 1 wherein the dihydroxy compound is a 4,4'-dioxy-(diarylene)-sulphoxide.

4. The combination of claim 1 in which each $n$ is zero.

5. The combination of claim 3 in which the dihydroxy compound is 4,4'-dihydroxy diphenylene sulphoxide.

6. A film-forming high molecular weight resinous thermoplastic linear polycarbonate consisting of the repeating units

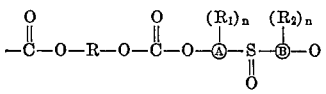

wherein R is a divalent hydrocarbon radical, A and B are aromatic radicals selected from the class consisting of benzene and naphthalene radicals, $R_1$ and $R_2$ are alkyl substituents containing up to four carbon atoms, and each $n$ is a number from 0 to 4 inclusive.

7. Products according to claim 6 wherein R is a diarylene-alkane and the oxygens by which it is bound are connected to the respective arylene rings of said diarylene-alkane.

8. The combination of claim 7 in which R is 2,2-diphenyl propane, the oxygens by which R is bound are connected to the para positions on the respective phenyl rings, and each $n$ is zero.

9. The combination of claim 6 in which each $n$ is zero.

References Cited in the file of this patent

UNITED STATES PATENTS

| | | |
|---|---|---|
| 2,455,653 | Bralley et al. | Dec. 7, 1948 |
| 2,799,666 | Caldwell | July 16, 1957 |

FOREIGN PATENTS

| | | |
|---|---|---|
| 546,375 | Belgium | Mar. 23, 1956 |